United States Patent
Mudireddy et al.

(10) Patent No.: US 11,153,218 B2
(45) Date of Patent: Oct. 19, 2021

(54) TRANSMISSION CONTROL PROTOCOL ACKNOWLEDGEMENT MANAGEMENT

(71) Applicant: QUALCOMM Incorporated, San Diego, CA (US)

(72) Inventors: Srinivas Reddy Mudireddy, San Diego, CA (US); Arnaud Meylan, San Diego, CA (US); Shailesh Maheshwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 16/361,130

(22) Filed: Mar. 21, 2019

(65) Prior Publication Data

US 2019/0297020 A1 Sep. 26, 2019

Related U.S. Application Data

(60) Provisional application No. 62/646,799, filed on Mar. 22, 2018.

(51) Int. Cl.
| | |
|---|---|
| *H04L 12/26* | (2006.01) |
| *H04L 12/855* | (2013.01) |
| *H04L 29/06* | (2006.01) |
| *H04L 12/807* | (2013.01) |
| *H04L 12/823* | (2013.01) |
| *H04L 12/801* | (2013.01) |
| *H04L 1/18* | (2006.01) |
| *H04W 4/70* | (2018.01) |

(52) U.S. Cl.
CPC ........ *H04L 47/2466* (2013.01); *H04L 1/1854* (2013.01); *H04L 47/193* (2013.01); *H04L 47/27* (2013.01); *H04L 47/323* (2013.01); *H04L 69/163* (2013.01); *H04W 4/70* (2018.02)

(58) Field of Classification Search
None
See application file for complete search history.

(56) References Cited

U.S. PATENT DOCUMENTS

| | | | |
|---|---|---|---|
| 8,717,900 B2 * | 5/2014 | Williams | H04L 69/163 370/236 |
| 2013/0205037 A1 | 8/2013 | Biswas | |
| 2017/0063498 A1 | 3/2017 | Venkatsuresh et al. | |

OTHER PUBLICATIONS

International Search Report and Written Opinion—PCT/US2019/023651—ISA/EPO—dated Jun. 26, 2019 (182387WO).

* cited by examiner

*Primary Examiner* — Zewdu A Beyen
(74) *Attorney, Agent, or Firm* — Qualcomm Incorporated

(57) ABSTRACT

Methods, systems, and devices for wireless communications are described. In aspects, a wireless device such as a user equipment (UE) may identify an amount of acknowledgement (ACK) reduction associated with an applications processor. The amount of ACK reduction may be determined based on a communication from the applications processor, or an ACK frequency in a group of packets received from the applications processor. The UE may determine whether to modify an ACK management scheme (e.g., a transmission control protocol (TCP) ACK coalescing scheme) based at least in part on the amount of ACK reduction associated with the applications processor. The UE may modify the ACK management scheme. The UE may transmit ACKs in accordance with the modified ACK management scheme. Numerous other aspects are provided.

30 Claims, 9 Drawing Sheets

TRANSMISSION CONTROL PROTOCOL ACKNOWLEDGEMENT MANAGEMENT

CROSS REFERENCES

The present Application for Patent claims the benefit of U.S. Provisional Patent Application No. 62/646,799 by MUDIREDDY, et al., entitled "TRANSMISSION CONTROL PROTOCOL ACKNOWLEDGEMENT MANAGEMENT," filed Mar. 22, 2018, assigned to the assignee hereof, and expressly incorporated by reference herein in its entirety.

FIELD OF THE DISCLOSURE

The following relates generally to wireless communication, and more specifically to transmission control protocol acknowledgement management or coalescing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a first wireless device may transmit data to a second wireless device in packet form. The second wireless device may provide feedback to the first wireless device to indicate whether the second wireless device successfully received the packet or packets. The second wireless device may transmit a positive acknowledgement message or indication (ACK) to the first wireless device if it successfully receives one or more packets, and may transmit a negative acknowledgement message or indication (NACK) to the first wireless device if it does not successfully receive a packet. The first wireless device may re-transmit the packet if the first wireless device does not receive feedback from the second wireless device, on the assumption that the second wireless device did not receive the packet. Improved transmission of acknowledgement messages or indications is desired.

SUMMARY

The described techniques relate to improved methods, systems, devices, or apparatuses that support transmission control protocol acknowledgement management or coalescing. Generally, the described techniques provide for determining whether to modify an acknowledgement (ACK) management procedure based on ACK reduction at an applications processor (AP). A wireless device such as a user equipment (UE) or a base station may identify an amount of ACK reduction associated with an AP. The amount of ACK reduction may be determined based on a communication from the AP or an ACK frequency in a group of packets received from the AP. The UE or base station may determine whether to modify an ACK management scheme (e.g., a transmission control protocol (TCP) ACK coalescing scheme) based at least in part on the amount of ACK reduction associated with the AP. The UE or base station may modify the ACK management scheme by not removing ACKs from a group of packets or by applying a modified reduction factor. The UE or base station may transmit ACKs in accordance with the modified ACK management scheme.

A method of wireless communication is described. The method may include identifying, by a wireless device, an amount of ACK reduction associated with an AP of the wireless device, determining, at the wireless device, whether to modify a TCP ACK management scheme based at least in part on the amount of ACK reduction associated with the AP, and transmitting ACKs in accordance with the TCP ACK management scheme.

An apparatus for wireless communication is described. The apparatus may include means for identifying, by a wireless device, an amount of ACK reduction associated with an AP of the wireless device, means for determining, at the wireless device, whether to modify a TCP ACK management scheme based at least in part on the amount of ACK reduction associated with the AP, and means for transmitting ACKs in accordance with the TCP ACK management scheme.

Another apparatus for wireless communication is described. The apparatus may include a processor, memory in electronic communication with the processor, and instructions stored in the memory. The instructions may be operable to cause the processor to identify, by a wireless device, an amount of ACK reduction associated with an AP of the wireless device, determine, at the wireless device, whether to modify a TCP ACK management scheme based at least in part on the amount of ACK reduction associated with the AP, and transmit ACKs in accordance with the TCP ACK management scheme.

A non-transitory computer-readable medium for wireless communication is described. The non-transitory computer-readable medium may include instructions operable to cause a processor to identify, by a wireless device, an amount of ACK reduction associated with an AP of the wireless device, determine, at the wireless device, whether to modify a TCP ACK management scheme based at least in part on the amount of ACK reduction associated with the AP, and transmit ACKs in accordance with the TCP ACK management scheme.

In some examples of the method, apparatus, and non-transitory computer-readable medium described above, determining whether to modify the TCP ACK management scheme may include determining a combined ACK reduction as a combination of the ACK reduction associated with the AP of the wireless device and the TCP ACK management scheme. Some examples of the method, apparatus, and non-transitory computer-readable medium described above may further include processes, features, means, or instructions for determining whether the combined ACK reduction satisfies a threshold.

In some examples of the method, apparatus, and non-transitory computer-readable medium described above, the amount of ACK reduction may be based at least in part on a bit rate of a packet rate of data on a corresponding TCP connection.

In some examples of the method, apparatus, and non-transitory computer-readable medium described above, identifying the amount of ACK reduction associated with the AP of the wireless device may include receiving an indication of the amount of ACK reduction associated with or applied by the AP.

Some examples of the method, apparatus, and non-transitory computer-readable medium described above may further include processes, features, means, or instructions for receiving, with the indication of the amount of ACK reduction associated with the AP, an indication that the AP may be receiving data pursuant to at least one of a generic receive offload (GRO) procedure or a receive segment coalescing (RSC) procedure.

Some examples of the method, apparatus, and non-transitory computer-readable medium described above may further include processes, features, means, or instructions for determining, for a plurality of packets and based at least in part on the indication, the amount of ACK reduction associated with or applied by the AP.

Some examples of the method, apparatus, and non-transitory computer-readable medium described above may further include processes, features, means, or instructions for determining, for each of a plurality of streams and based at least in part on the indication, the amount of ACK reduction associated with or applied by the AP.

In some examples of the method, apparatus, and non-transitory computer-readable medium described above, identifying the amount of ACK reduction associated with the AP at the wireless device may include receiving, from the AP, a plurality of packets for transmission. Some examples of the method, apparatus, and non-transitory computer-readable medium described above may further include processes, features, means, or instructions for determining a TCP ACK frequency within the plurality of packets.

In some examples of the method, apparatus, and non-transitory computer-readable medium described above, determining the TCP ACK frequency may include determining that a number of TCP ACKs included in the plurality of packets may be equal to a multiple of a maximum segment size (MSS) for the plurality of packets.

In some examples of the method, apparatus, and non-transitory computer-readable medium described above, determining the TCP ACK frequency may include determining that a number of TCP ACKs included in the plurality of packets matches an expected TCP ACK frequency for a corresponding TCP stream directed towards the AP.

Some examples of the method, apparatus, and non-transitory computer-readable medium described above may further include processes, features, means, or instructions for modifying a TCP ACK coalescing parameter in order to modify the TCP ACK management scheme, where the TCP ACK coalescing parameter comprises a packet-to-TCP ACK ratio.

In some examples of the method, apparatus, and non-transitory computer-readable medium described above, modifying the TCP ACK coalescing parameter may include dropping TCP ACKs from a plurality of packets received from the AP based at least in part on the packet-to-TCP ACK ratio.

In some examples of the method, apparatus, and non-transitory computer-readable medium described above, determining whether to modify the TCP ACK management scheme may include determining to refrain from modifying a number of TCP ACKs in a plurality of packets received from the AP based at least in part on a combination of the ACK reduction associated with the AP of the wireless device and the TCP ACK management scheme not satisfying a threshold. In some examples of the method, apparatus, and non-transitory computer-readable medium the AP may be implemented in hardware, software, of any combination thereof.

DETAILED DESCRIPTION

Figure 1:
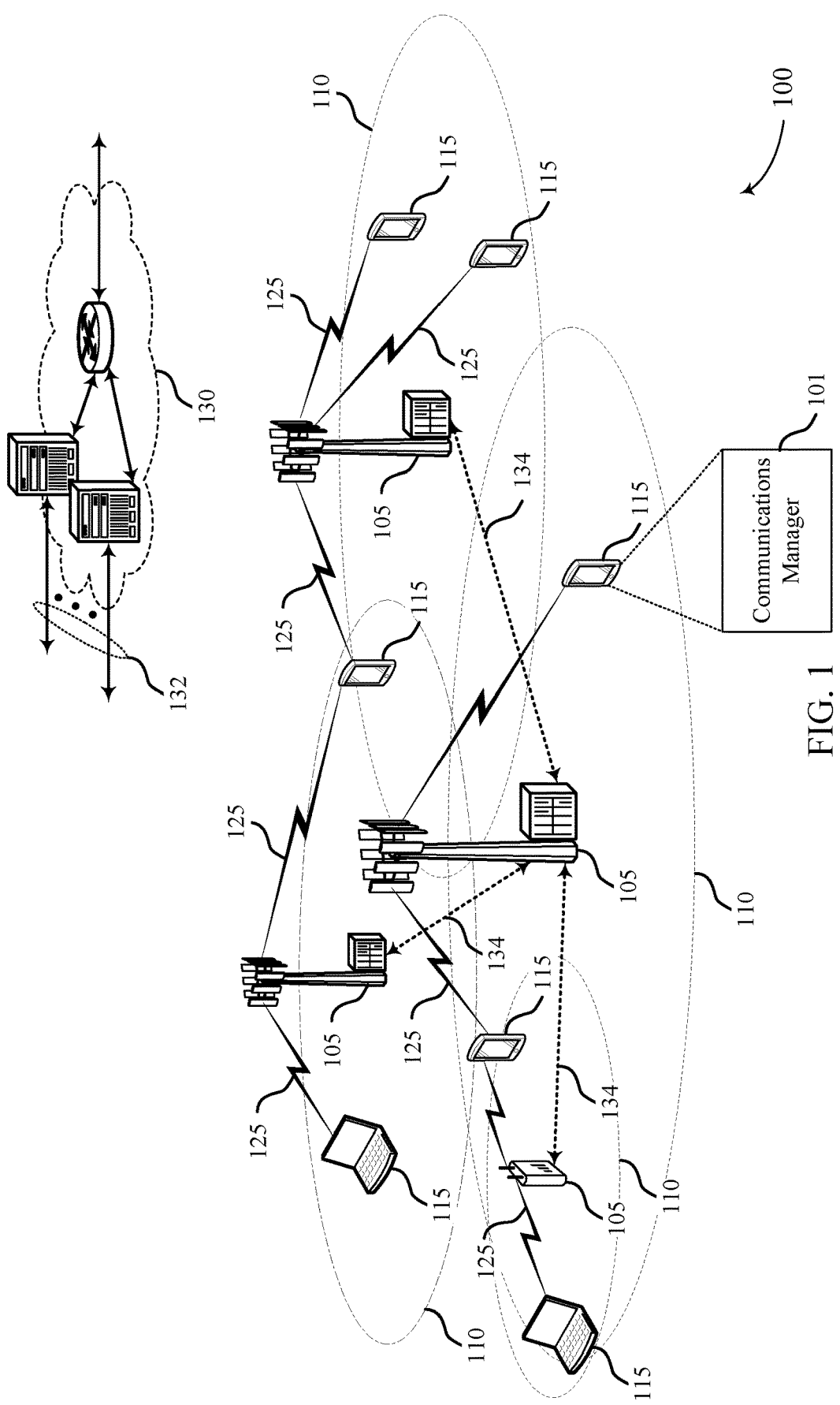
FIG. 1 illustrates an example of a system for wireless communication that supports transmission control protocol acknowledgement management in accordance with aspects of the present disclosure.

A transmitting wireless device may re-transmit a packet if the transmitting device does not receive feedback from a receiving wireless device for that particular packet or a packet having a higher sequence number. Because an acknowledgement (ACK) for a packet having a higher sequence number may suffice to acknowledge receipt of an earlier packet, for example, the receiving device (e.g., the device sending the ACK) may reduce the number of ACKs it transmits to some extent without unduly affecting system performance. For example, the modem of the receiving device may reduce the number of ACKs it transmits to the transmitting device by a reduction factor N, which may be chosen based on a maximum reduction amount that will not affect system performance.

However, in some examples, the receiving wireless device may also employ a procedure at a non-central-processing unit or applications processor (AP), for example, which may reduce a number of ACKs. In some examples, the non-central-processing unit may be the AP implemented in hardware or some combination of hardware and software. For example, the non-central-processing unit or AP may employ a procedure such as a generic receive offload (GRO) procedure and/or a receive segment coalescing (RSC) procedure, which may effectively apply an additional ACK reduction factor to a stream of packets. In some examples, RSC may reduce processing overhead by coalescing a sequence of received segments or packets and passing them in a single operation or fewer operations, such that one header or fewer headers may be representative of the entire sequence or packets. In some examples, GRO may be an offloading technique to reduce per-packet processing overhead. GRO may reassemble small packets or individual packets into larger packets, thus enabling applications to process fewer large packets directly and additionally reducing the number of packets to be processed. In some examples, the combination of the ACK reduction procedure applied at the non-central-processing unit or AP, and the transmission control protocol (TCP) ACK reduction procedure applied by the modem (e.g., also referred to as TCP ACK coalescing), may result in a total reduction factor that exceeds a maximum reduction amount (e.g., a maximum ACK reduction amount that does not negatively affect system performance for a given TCP stream). In some examples, the non-central-processing unit may be the AP implemented in hardware or some combination of hardware and software.

In order to ensure that a collective ACK reduction amount satisfies a maximum ACK reduction threshold, a modem of a wireless device, a component thereof, or other component of a wireless device may identify an amount of ACK reduction associated with a non-central-processing unit or an AP at the wireless device. The wireless device may identify the amount of ACK reduction based on an indication of the amount of ACK reduction received from the non-central-processing unit or AP of the wireless device. Alternatively, the wireless device may identify the amount of ACK reduction based at least in part on an ACK frequency in a group of packets received from the non-central-processing unit or AP. The wireless device may determine whether to modify a TCP ACK management scheme (e.g., such as a TCP ACK coalescing scheme) based at least in part on the identified amount of ACK reduction, e.g., by refraining from removing additional ACKs from the group of packets or modifying an ACK reduction factor applied to the group of packets. In some examples, TCP ACK coalescing schemes may be employed on a modem to reduce the number of ACKS in uplink, which may reduce the processing load. TCP ACK coalescing schemes may be one example of TCP ACK management schemes. The TCP ACK management scheme may be a scheme or procedure determined by a TCP ACK manager to improve efficiency and reduce the number of ACKs in uplink, and may be based at least in part on an ACK rate, a modem work load, a memory utilization, a data transmission rate, a thermal status, a link capacity, or a combination thereof. The wireless device may then transmit one or more ACKs from the group of packets in accordance with the modified TCP ACK management scheme. The wireless device may be either a user equipment (UE) or a base station, for example. In some examples, the wireless device may receive an indication of whether the GRO and/or RSC procedures are being employed in addition to TCP ACK coalescing, which may allow the wireless device to determine whether to employ TCP ACK coalescing at a reduced rate or disable it completely. Advantageously, this may ensure that the system performance for a given TCP stream may not be negatively affected and additionally ensure compliance with the maximum ACK reduction threshold. Further, this may allow the TCP ACK coalescing scheme to be employed with the GRO and/or RSC procedures.

Aspects of the disclosure are initially described in the context of a wireless communications system. Aspects of the disclosure are further illustrated by and described with reference to apparatus diagrams, system diagrams, and flowcharts that relate to transmission control protocol acknowledgement management.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may comprise of, or may be implemented in, various articles such as appliances, vehicles, drones, robots, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may include 6 or 7 modulation symbol periods (e.g., depending on the length of the cyclic prefix prepended to each symbol period). Excluding the cyclic prefix, each symbol period may include 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots including one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

UEs 115 or base stations 105 may include a communications manager 101, which may implement techniques for managing TCP ACKs as described herein. In the wireless communications system 100 of FIG. 1, the communications manager 101 is illustrated as being within a UE 115. However, the communications manager 101 may be included within any of the wireless devices of wireless communications system 100, including UEs 115 and base stations 105. The communications manager 101 may receive a plurality of packets, including a plurality of ACKs, from a non-central-processing unit or an AP of the wireless device. The communications manager 101 may identify an amount of ACK reduction associated with a non-central processing unit or the AP of the wireless device. In some examples, the communications manager 101 may identify the amount of ACK reduction based on an indication of an amount of ACK reduction provided by the non-central-processing unit or AP. For example, the indication of the amount of ACK reduction may be an indication of an effective reduction factor at the non-central-processing unit or AP, or an indication that the non-central-processing unit or AP is receiving data pursuant to a GRO or RSC procedure. In some other examples, the communications manager 101 may identify the amount of ACK reduction based on an ACK frequency or periodicity within a stream of the plurality of packets, which may be a packet-per-ACK ratio. For example, the communications manager 101 may compare a determined packet-per-ACK ratio to an expected packet-per-ACK ratio to identify the amount of ACK reduction.

The communications manager 101 may determine whether to modify a TCP ACK management scheme (such as a TCP ACK coalescing scheme) based at least in part on an amount of ACK reduction associated with the non-central-processing unit or the AP. For example, the communications manager 101 may determine a combined ACK reduction based at least in part on the amount of ACK reduction at the non-central-processing unit or AP, and a TCP ACK coalescing factor to be applied by the communications manager 101. The communications manager 101 may compare the combined ACK reduction to a maximum ACK reduction threshold (e.g., a maximum reduction factor). When the combined ACK reduction is greater than, or greater than or equal to, the maximum reduction factor, the communications manager 101 may determine to modify the TCP ACK management scheme.

In some examples, the communications manager 101 may modify the TCP ACK management scheme by refraining from applying ACK reduction, e.g., refraining from removing any ACKs from the packets received from the non-central-processing unit or AP. In some other examples, the communications manager 101 may modify the TCP ACK management scheme by modifying the ACK reduction factor applied by the communications manager 101. The communications manager 101 may determine a modified reduction factor based at least in part on the amount of ACK reduction at the non-central-processing unit or AP, a maximum ACK reduction amount, or a combination thereof. The communications manager 101 may then apply the modified ACK reduction factor. In some examples, the non-central-processing unit may be an AP implemented in hardware or some combination of hardware and software.

The communications manager 101 may cause the UE 115 or base station 105 to transmit ACKs in accordance with the modified ACK management scheme.

Figure 2:
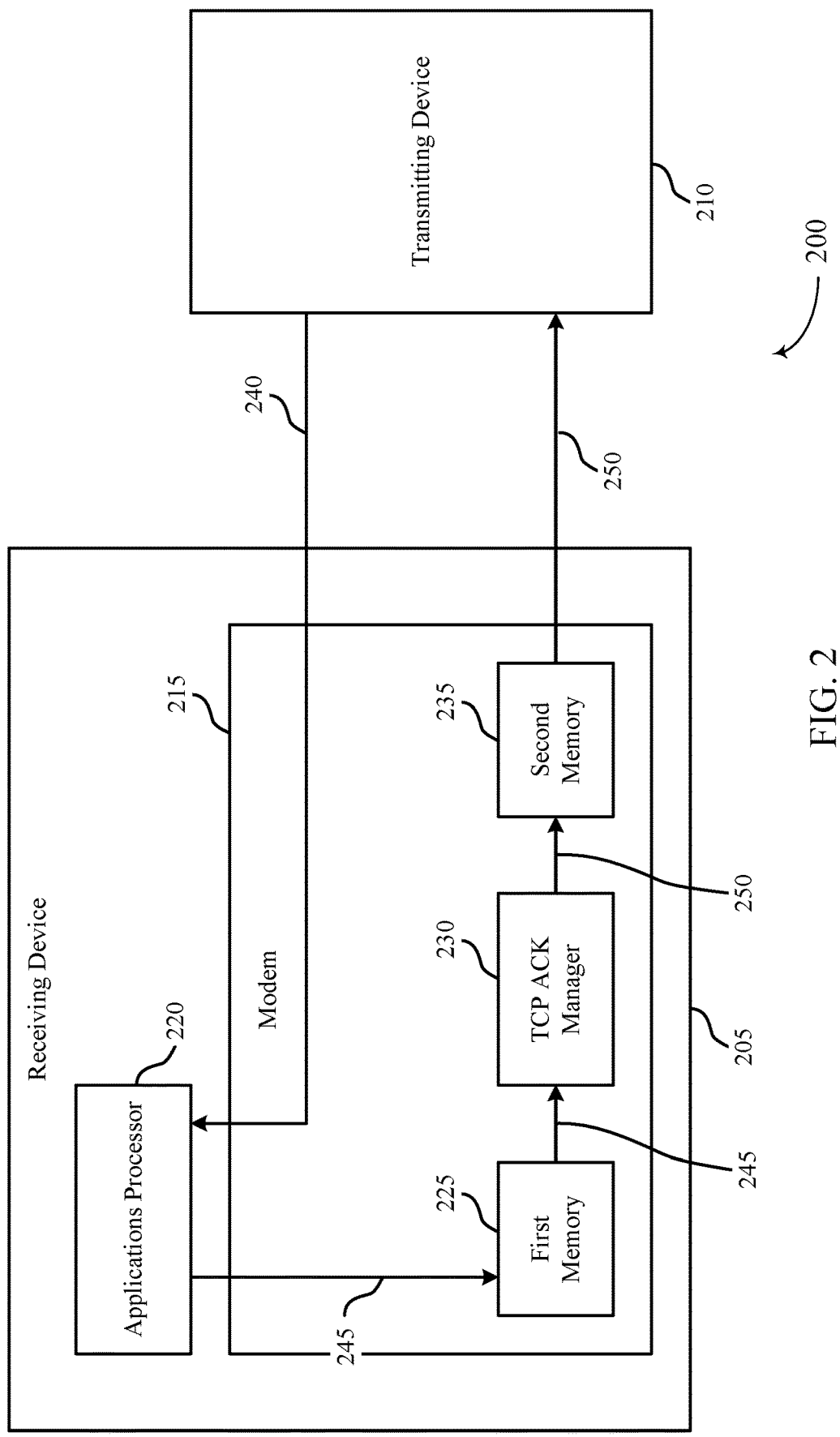
FIG. 2 illustrates an example of a wireless communications system that supports transmission control protocol acknowledgement management in accordance with aspects of the present disclosure.

FIG. 2 illustrates an example of a wireless communications system 200 that supports transmission control protocol acknowledgement management in accordance with various aspects of the present disclosure. In some examples, wireless communications system 200 may implement aspects of wireless communications system 100.

The wireless communications system 200 may include a receiving device 205 and a transmitting device 210. The receiving device 205 and transmitting device 210 may each be examples of aspects of either base stations 105 and/or UEs 115 as described with reference to FIG. 1. The receiving device 205 may include a modem 215 and an AP 220. The modem 215 may include a first memory 225, a TCP ACK manager 230, and a second memory 235. TCP ACK manager 230.

The transmitting device 210 may transmit data 240 to the receiving device 205. The data 240 may include one or more data packets. The data 240 may be transmitted by an AP (not shown) at the transmitting device 210, which may handle tasks related to one or more applications on the transmitting device 210. The data 240 may be received at the receiving device 205 and routed, via the modem 215, to the AP 220 of the receiving device 205.

The AP 220 may handle tasks related to one or more applications running on the receiving device 205. In response to receiving the data 240, the AP 220 may generate ACKs 245. In some examples, the AP 220 may generate an ACK for each received data packet. As an example of a default setting, the AP 220 may generate an ACK for every other received data packet. In other examples, the AP 220 may generate an ACK for fewer than each of the received packets, in accordance with an ACK reduction process. Although the present disclosure generally refers to ACK reduction at an AP, ACK reduction may also be implemented in connection with other components such as a non-central-processing unit. In some examples, the non-central-processing unit may be the AP implemented in hardware or some combination of hardware and software.

The ACKs 245 generated by the AP 220 may be stored in the first memory 225. The first memory 225 may be a physical or logical memory associated with the modem 215. In some examples, the first memory 225 may be a part of the modem 215. In some other examples, the first memory 225 may be located outside of the modem 215.

The TCP ACK manager 230 may transfer some or all of the ACKs 245 from the first memory 225 to the second memory 235. For example, the TCP ACK manager 230 may retrieve the ACKs 245 from the first memory 225, and transmit a subset of the ACKs 250 to the second memory 235. The second memory 235 may be a physical or logical memory associated with the modem 215. In some examples, the second memory 235 may be part of the modem 215. In some other examples, the second memory 235 may be located outside of the modem 215. The modem 215 may transmit the subset of the ACKs 250 to the transmitting device 210.

The TCP ACK manager 230 may identify a subset of the ACKs 250 generated by the AP 220 to transmit to the second memory 235 and, subsequently, to the transmitting device 210. The reduction of ACKs may save memory space and/or processing cycles at the modem, which may reduce modem overhead and cost. This reduction of ACKs associated with the modem 215 may be referred to herein as TCP ACK coalescing.

In some examples, the TCP ACK manager 230 may retrieve the ACKs 245 generated by the AP 220 from the first memory 225 at regular intervals, e.g., every 1 millisecond. Accordingly, the TCP ACK manager 230 may operate on a batch of ACKs when performing the ACK management procedure.

In some examples, the TCP ACK manager 230 may perform ACK management based at least in part on an ACK rate, a modem work load, a memory utilization, a data transmission rate, a thermal status, a link capacity, or a combination thereof. For example, the TCP ACK manager 230 may perform ACK management when the number of ACKs in a batch (e.g., corresponding to a certain time interval such as 1 millisecond) exceeds a threshold ACK count. The threshold ACK count may be based at least in part on the category (e.g., LTE radio category) of the receiving device 205. The threshold ACK count may be directly correlated to the category of the receiving device 205, such that a higher category of the receiving device 205 corresponds to a higher threshold ACK count. In some examples, the TCP ACK manager 230 may not perform ACK management when the ACK rate is low, because reduction in such a state (e.g., in the slow start phase of TCP flow control) may unnecessarily slow down the data transfer.

As another example, the TCP ACK manager 230 may perform ACK management when a modem load is greater than a threshold modem load. As yet another example, the TCP ACK manager 230 may perform ACK management when the memory utilization of the receiving device 205 satisfies a memory utilization threshold (e.g., when the memory utilization of the receiving device 205 exceeds, or meets or exceeds, a threshold memory utilization amount). As a further example, the TCP ACK manager 230 may perform ACK management when a data transmission rate is greater than, or is greater than or equal to, a threshold data transmission rate. As another example, the TCP ACK manager 230 may perform ACK management when a thermal status of the receiving device 205, e.g., when a temperature of one or more parts of the receiving device 205 is greater than, or is greater than or equal to, a threshold temperature. As a further example, the TCP ACK manager 230 may perform ACK management when a capacity of a link between the receiving device 205 and the transmitting device 210 is below a threshold link capacity. In such examples, the ACK management may alleviate the limitation of TCP throughput based on the rate at which TCP ACKs may be delivered.

In some examples, the TCP ACK manager 230 may determine whether to implement ACK management for a batch of ACKs based at least in part on the current batch of ACKs (e.g., based at least in part on the number of ACKs in the current batch). In some other examples, the TCP ACK manager 230 may determine whether to implement ACK management for a current batch of ACKs based at least in part on one or more previous batches of ACKs, e.g., based at least in part on the number of ACKs in a previous batch or a rolling average of the number of ACKs in n previous batches.

In some examples, the TCP ACK manager 230 may determine whether to implement ACK management for each TCP flow separately, e.g., by counting the number of ACKs in a TCP flow for a batch and comparing that count to a threshold per-TCP flow ACK count. The TCP flow for each ACK may be determined based at least in part on the sender IP address, the sender port number, the receiver IP address, and/or the receiver port number. In some other examples, the TCP ACK manager 230 may determine whether to implement ACK management across TCP flows.

The TCP ACK manager 230 may perform ACK management based at least in part on a reduction factor N. In some examples, the number of unique ACKs 250 moved to the second memory 235 may be equal to the number of unique ACKs 245 stored at the first memory 225 divided by the reduction factor N. For example, the TCP ACK manager 230 may operate with N=5. In such an example, for 20 unique ACKs stored at the first memory 225, the TCP ACK manager 230 may transfer four unique ACKs to the second memory 235, and discard the remaining sixteen unique ACKs. In some examples, the reduction factor N may be determined based at least in part on a modem load of the receiving device 205, which may be determined based at least in part on a load of a modem processor (e.g., a processor dedicated to the modem).

In some examples, the TCP ACK manager 230 may apply the reduction factor N based on sequence numbers of the ACKs in a batch or the ACK order of the ACKs in a batch. For example, the current batch may include 20 ACKs, and the TCP ACK manager 230 may have a reduction factor N=5, such that 4 ACKs from the batch may be transmitted to the second memory 235. In some examples, the TCP ACK manager 230 may transmit the 4 ACKs with the highest sequence numbers. In some examples, the TCP ACK manager 230 may transmit the ACK with the lowest sequence number and the 3 ACKs with the highest sequence numbers. In some examples, the TCP ACK manager 230 may transmit the first ACK in each group of five, such that the first, sixth, eleventh, and sixteenth ACKs may be transmitted to the second memory 235.

In some examples, the AP 220 may also implement an ACK reduction procedure. For example, the AP 220 may apply a GRO procedure and/or an RSC procedure. The use of such procedures may result in a decrease in the number of ACKs 245 being generated by the AP 220 and stored at the first memory 225. In some examples, RSC may reduce processing overhead by coalescing a sequence of received segments or packets and passing them in a single operation or fewer operations, such that one header or fewer headers may be representative of the entire sequence or packets. In some examples, GRO may be an offloading technique to reduce per-packet processing overhead. GRO may reassemble small packets or individual packets into larger packets, thus enabling applications to process fewer large packets directly and additionally reducing the number of packets to be processed.

However, the use of such ACK reduction procedures at the AP 220 may impact the operation of the TCP ACK manager 230. For example, the reduction factor N may be selected based at least in part on a minimum ACK threshold. While the network may not be adversely affected by some additional ACK management by the TCP ACK manager 230, the removal of too many ACKs may adversely impact network performance. For example, the receipt of ACKs for less than one out of every ten packets transmitted by the transmitting device 210 may impact the performance of the transmitting device 210, e.g., because the loss of an ACK from radio failure or the router dropping packets may be exacerbated, and/or the transmitting device 210 may not be able to ramp up throughput sufficiently if too few ACKs are received, thus increasing the total duration of data transfer. Accordingly, the TCP ACK manager 230 may operate at a reduction factor $N_{DM}=5$, for example. However, if the AP 220 additionally uses an ACK reduction procedure, the use of the reduction factor $N_{DM}=5$ by the TCP ACK manager 230 may result in a total ACK reduction factor $N_{TOTAL}$ that exceeds the maximum ACK reduction factor $N_{MAX}=10$. For example, the AP 220 may implement a reduction procedure which may have an effective reduction rate at the AP 220 of $N_{AP}=3$ (e.g., by generating only one ACK for every three packets). In such examples, the receiving device 205 may transmit only one ACK for every fifteen packets. The TCP ACK manager 230 may use adjustment techniques to its own TCP ACK management schemes (e.g., TCP ACK coalescing schemes) to mitigate the effects of the ACK reduction at the AP 220. In some examples, TCP ACK coalescing schemes may be employed on a modem to reduce the number of ACKS in uplink, which may reduce the processing load. TCP ACK coalescing schemes may be one example of TCP ACK management schemes. The TCP ACK management scheme may be a scheme or procedure determined by the TCP ACK manager 230 and may be based at least in part on an ACK rate, a modem work load, a memory utilization, a data transmission rate, a thermal status, a link capacity, or a combination thereof.

The TCP ACK manager 230 may identify an amount of ACK reduction associated with the AP 220 or another non-central-processing unit. The amount of ACK reduction may be, for example, an effective reduction factor. In some examples, the TCP ACK manager 230 may receive an indication of the amount of ACK reduction from the AP 220, either directly or via one or more intermediaries. For example, the TCP ACK manager 230 may receive an indication that the AP 220 is receiving data pursuant to at least one of a GRO procedure or an RSC procedure.

In some other examples, the TCP ACK manager 230 may determine the amount of ACK reduction based at least in part on a number of payload bytes ACK'ed by one TCP acknowledgement. By determining a number of payload bytes ACK' ed by one TCP acknowledgement, control of TCP data is based on a TCP ACK throughput ratio. This may be relevant at a network level, and does not depend on a packet size or fragmentation. This example may be implemented based on an ACK sequence number (SN). The advance of ACK SNs between ACKs may be determined while keeping track of a number of ACKs received for every "x" bytes of received payload.

In some other examples, the TCP ACK manager 230 may determine the amount of ACK reduction based at least in part on the ACKs 245 generated by the AP 220. For example, the TCP ACK manager 230 may receive a plurality of packets for transmission from the AP 220 (e.g., via the first memory 225). The plurality of packets may include one or more ACKs. The TCP ACK manager 230 may determine an ACK frequency within the plurality of packets. The ACK frequency may be determined as a number of packets per ACK or a segment size per ACK. The TCP ACK manager 230 may compare the determined ACK frequency to an expected ACK frequency to determine the amount of ACK reduction applied by the AP 220.

For example, the TCP ACK manager 230 may determine that the plurality of packets includes one ACK per every six packets. The TCP ACK manager 230 may have an expected ACK frequency of one ACK per every two packet. In such an example, the TCP ACK manager 230 may determine that the amount of ACK reduction is 3 (e.g., the effective reduction factor at the AP 220 $N_{AP}=3$). As another example, the TCP ACK manager 230 may determine that the plurality of packets includes one packet for every three segments of a maximum segment size (MSS). The TCP ACK manager 230 may have an expected frequency of one ACK per MSS. In such an example, the data mover may determine that the amount of ACK reduction is 3 (e.g., the effective reduction factor at the AP 220 $N_{AP}$=3). As a further example, the TCP ACK manager 230 may determine the amount of ACK reduction applied by the AP 220 by comparing the number of ACKs 245 received from the AP 220 via the first memory 225 with a number of packets received from the transmitting device 210.

The TCP ACK manager 230 may then determine whether to modify the ACK management scheme. The TCP ACK manager 230 may make such a determination based at least in part on the identified amount of ACK reduction at the AP 220. In some examples, the TCP ACK manager 230 may determine a combined ACK reduction based at least in part on the amount of ACK reduction at the AP 220. For example, a total reduction factor $N_{TOTAL}$ may be determined by multiplying the effective ACK reduction factor at the AP 220 $N_{AP}$ and the reduction factor at the TCP ACK manager 230 $N_{DM}$. The TCP ACK manager 230 may determine whether the combined ACK reduction satisfies a threshold. For example, when $N_{TOTAL}$ is less than, or is less than or equal to, a maximum ACK reduction factor $N_{MAX}$, the TCP ACK manager 230 may determine not to modify the ACK management scheme. When $N_{TOTAL}$ is greater than, or is greater than or equal to, a maximum ACK reduction factor $N_{MAX}$, the TCP ACK manager 230 may determine to modify the ACK management scheme.

In some examples, the TCP ACK manager 230 may modify the ACK management scheme by not applying the ACK management scheme for a current batch of ACKs. In such examples, the TCP ACK manager 230 may refrain from modifying the number of TCP ACKs in the batch, and may transmit all ACKs 245 stored at the first memory 225 to the second memory, such that the ACKs 250 are the same as the ACKs 245. In some other examples, the TCP ACK manager 230 may modify the reduction factor at the TCP ACK manager 230 $N_{DM}$. For example, the TCP ACK manager 230 may modify the reduction factor at the TCP ACK manager 230 $N_{DM}$ based at least in part on the maximum ACK reduction factor $N_{MAX}$ and the effective ACK reduction factor at the AP 220 $N_{AP}$. In some examples, the TCP ACK manager 230 may divide the maximum ACK reduction factor $N_{MAX}$ by the effective ACK reduction factor at the AP 220 $N_{AP}$, and select a modified reduction factor $N_{MOD}$ that is less than or equal to the product thereof. For example, when $N_{MAX}$=10 and $N_{AP}$=4, the data mover may select a modified reduction actor $N_{MOD}$ that is less than 2.5, e.g., N=2.

In some examples, the TCP ACK manager 230 may modify the ACK management scheme on a per-TCP connection basis. In some other examples, the TCP ACK manager 230 may modify the ACK management scheme across TCP connections.

The TCP ACK manager 230 may apply the modified ACK management scheme and transmit the subset of ACKs 250 to the second memory 235. The modem 215 may transmit the subset of ACKs 250 to the transmitting device 210.

Figure 3:
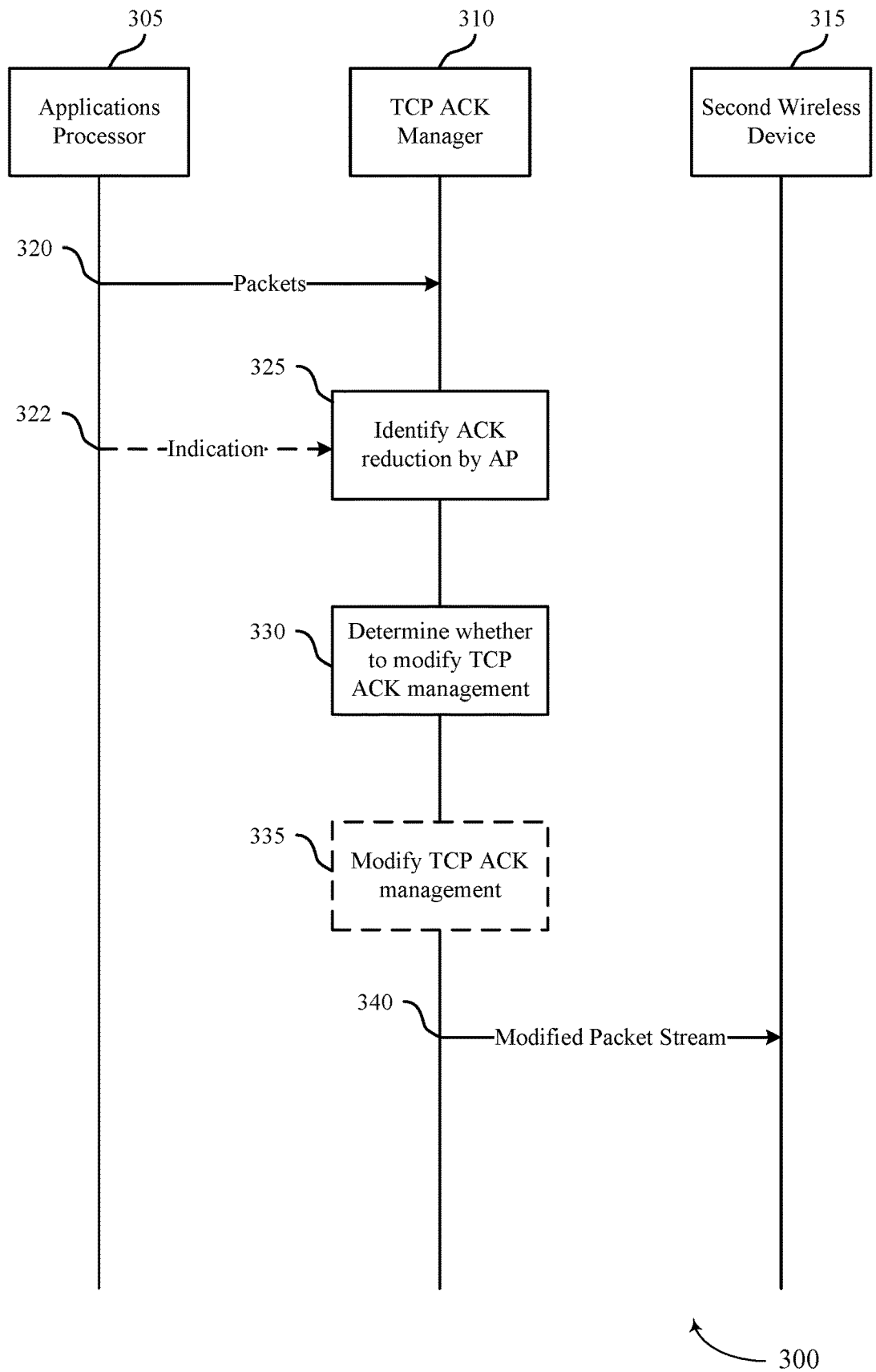
FIG. 3 illustrates an example of a communications flow in a wireless communications system that supports transmission control protocol acknowledgement management in accordance with aspects of the present disclosure.

FIG. 3 illustrates an example of a communications flow 300 in a wireless communications system that supports transmission control protocol acknowledgement management in accordance with various aspects of the present disclosure. In some examples, wireless communications system 300 may implement aspects of wireless communication systems 100.

The communications flow 300 may show communications between a first wireless device, which may include an AP 305 and a TCP ACK manager 310, and a second wireless device 315. The first wireless device and second wireless device 315 may each be examples of aspects of base stations 105 and/or UEs 115 as described with reference to FIG. 1. The AP 305 may be an example of aspects of AP 220 described with reference to FIG. 2. The TCP ACK manager 310 may be an example of aspects of TCP ACK manager 230 described with reference to FIG. 2. In some examples, a non-central-processing unit may be used in place of the AP 305.

The TCP ACK manager 310 may implement an ACK management scheme. When the AP 305 does not apply an ACK reduction procedure, the TCP ACK manager 310 may operate in accordance with an ACK reduction factor (for example, N=5).

The AP 305 may transmit packets 320 to TCP ACK manager 310. The AP 305 may transmit the packets 320 in response to receipt of one or more TCP data packets from the second wireless device 315. The plurality of packets 320 may include a plurality of ACKs. The AP 305 may transmit the packets 320 to the TCP ACK manager 310 via a memory such as first memory 225 described with reference to FIG. 2.

In some examples, the AP 305 may apply an ACK reduction procedure such as a GRO procedure or an RSC procedure. The use of the ACK reduction procedure may result in the AP 305 generating fewer ACKs that it otherwise would, such that the AP 305 has an effective ACK reduction factor $N_{AP}$.

In some examples, the AP 305 may transmit an indication 322 of an amount of ACK reduction to the TCP ACK manager 310. The indication 322 of the amount of ACK reduction may be transmitted with the packets 320, or may be transmitted in a separate communication. The indication 322 of the amount of ACK reduction may be an indication of the effective ACK reduction factor $N_{AP}$, or an indication that the AP 305 is receiving data pursuant to a GRO procedure or an RSC procedure.

The TCP ACK manager 310 may identify an amount of ACK reduction by the AP 305 at 320. The amount of ACK reduction may be based at least in part on a bit rate of a packet rate of data on the corresponding TCP connection. The amount of ACK reduction may be lower for lower bit rates, and may increase as the bit rates of the TCP connection increase. In some examples, the TCP ACK manager 310 may identify the amount of ACK reduction at the AP 305 based at least in part on the indication of the amount of ACK reduction provided by the AP 305. In some cases, the TCP ACK manager 310 may determine, for a plurality of packets and based at least in part on the indication, the amount of ACK reduction associated with or applied by the non-central processing unit or the AP 305. In some cases, the TCP ACK manager 310 may determine, for each of a plurality of streams and based at least in part on the indication, the amount of ACK reduction associated with or applied by the non-central processing unit or the AP 305. In this case, the AP 305 may send a time indication and the TCP ACK manager 310 may intelligently use the time indication to determine the amount of ACK reduction applied to different streams having different traffic patterns. In some other examples, the TCP ACK manager 310 may identify the amount of ACK reduction at the AP 305 based at least in part on the number of TCP ACKs included in the packets 320.

In yet additional examples, the TCP ACK manager 310 may determine an ACK ratio or an ACK reduction metric by either determining a number of payload bytes ACK'ed by one TCP acknowledgement, or a number of TCP payload packets ACK'ed by one TCP acknowledgment. By determining a number of payload bytes ACK' ed by one TCP acknowledgement, control of TCP data is based on a TCP ACK throughput ratio. This may be relevant at a network level, and does not depend on a packet size or fragmentation. This example may be implemented based on an ACK sequence number (SN). The advance of ACK SNs between ACKs may be determined while keeping track of a number of ACKs received for every "x" bytes of received payload. Alternatively, by determining a number of TCP payload packets ACK'ed by one TCP acknowledgement, a TCP congestion window algorithm may be controlled. The congestion window may grow with the number of ACKs. This example may work well for non-cubic versions of TCP.

The TCP ACK manager 310 may determine an ACK frequency for the packets 320. For example, the TCP ACK manager 310 may determine a packet-to-ACK ratio (e.g., a packet-to-TCP ACK ratio) for the packets 320. The packet-to-ACK ratio may be 8:1. The TCP ACK manager 310 may compare the determined packet-to-ACK ratio to an expected packet-to-ACK ratio, which may be 2:1. The TCP ACK manager 310 may determine an amount of ACK reduction by the AP 305 based on comparison. For example, the TCP ACK manager 310 may determine an effective ACK reduction factor at the AP 305 $N_{AP}=4$ by dividing the determined packet-to-ACK ratio (8:1) by the expected packet-to-ACK ratio (2:1).

The TCP ACK manager 310 may determine whether to modify the TCP ACK management scheme at 330. TCP ACK manager 310 may determine whether to modify the TCP ACK management scheme based at least in part on the identified amount of ACK reduction at the AP 305. The TCP ACK manager 310 may determine a combined ACK reduction factor $N_{TOTAL}$ based on the effective ACK reduction factor at the AP 305 $N_{AP}$ and the ACK reduction factor at the TCP ACK manager $N_{DM}$. For example, where $N_{AP}=4$ and $N_{DM}=5$, the TCP ACK manager may calculated $N_{TOTAL}=20$. The TCP ACK manager 310 may compare the combined ACK reduction factor $N_{TOTAL}$ to a maximum ACK reduction factor $N_{MAX}$. When the combined ACK reduction factor $N_{TOTAL}$ is less than, or less than or equal to, the maximum ACK reduction factor $N_{MAX}$, the TCP ACK manager 310 may determine not to modify the TCP ACK management scheme. When the combined ACK reduction factor $N_{TOTAL}$ is greater than, or greater than or equal to, the maximum ACK reduction factor $N_{MAX}$, the TCP ACK manager 310 may determine that the TCP ACK management scheme is to be modified. For example, where $N_{TOTAL}=20$ and $N_{MAX}=18$, the TCP ACK manager 310 may determine that the TCP ACK management scheme is to be modified.

The TCP ACK manager 310 may modify the TCP ACK management scheme at 335. The modification may be performed when the TCP ACK manager 310 determines that the TCP ACK management scheme should be modified at 330, and may be skipped when the TCP ACK manager 310 determines that the TCP ACK management scheme should not be modified at 330. In some examples, the TCP ACK manager 310 may modify the TCP ACK management scheme by refraining from removing any ACKs from the packets 320. In some other examples, the TCP ACK manager 310 may determine a modified ACK reduction factor $N_{MOD}$ that may be applied. The modified ACK reduction factor $N_{MOD}$ may be selected by dividing the maximum ACK reduction factor $N_{MAX}$ by the effective ACK reduction factor at the AP 305 $N_{AP}$, and selecting a value less than the product thereof. For example, where $N_{MAX}=18$ and $N_{AP}=4$, the TCP ACK manager 310 may apply $N_{MOD}<4.5$, e.g., $N_{MOD}=4$, $N_{MOD}=3$, or $N_{MOD}=2$.

The TCP ACK manager 310 may transmit modified packets 340 to the second wireless device 315, e.g., via a second memory 235 and/or a modem 215 as described with reference to FIG. 2. The modified packets 340 may be modified based at least in part on the modified TCP ACK management scheme, e.g., by refraining from removing ACKs from the packets 320 or removing ACKs from the packets 320 according to a modified ACK reduction factor.

Figure 4:
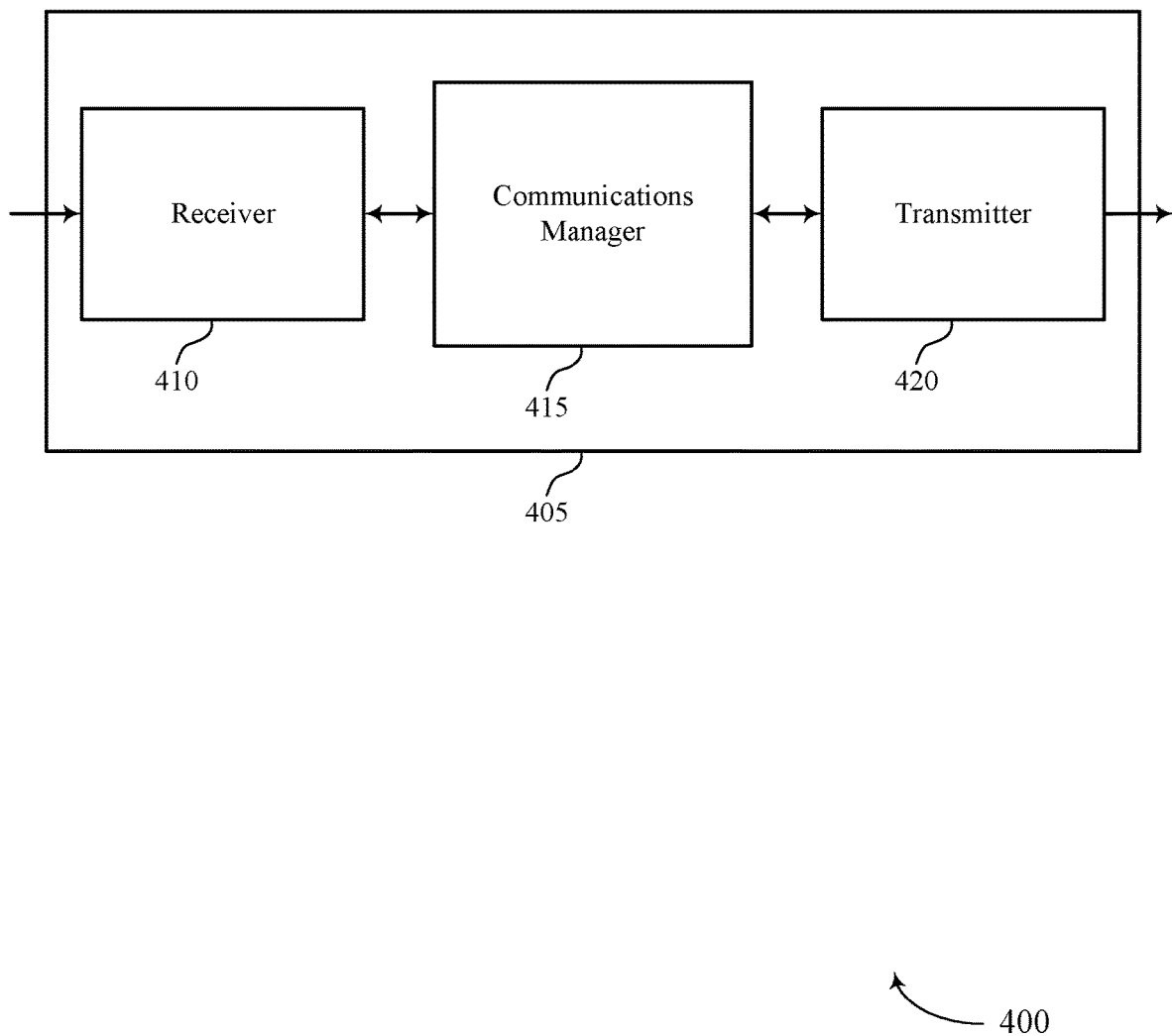
FIGS. 4 through 6 show block diagrams of a device that supports transmission control protocol acknowledgement management in accordance with aspects of the present disclosure.

FIG. 4 shows a block diagram 400 of a wireless device 405 that supports transmission control protocol acknowledgement management in accordance with aspects of the present disclosure. Wireless device 405 may be an example of aspects of a user equipment (UE) 115 as described herein. Wireless device 405 may include receiver 410, communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to transmission control protocol acknowledgement management, etc.). Information may be passed on to other components of the device. The receiver 410 may be an example of aspects of the transceiver 735 described with reference to FIG. 7. The receiver 410 may utilize a single antenna or a set of antennas.

Communications manager 415 may be an example of aspects of the UE communications manager 715 described with reference to FIG. 7 or the base station communications manager 815 described with reference to FIG. 8.

Communications manager 415 and/or at least some of its various sub-components may be implemented in hardware, software (e.g., executed by a processor), or any combination thereof. Software is construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. If implemented in software executed by a processor, the functions of the communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 415 and/or at least some of its various sub-components may be physically located at various positions, including being distributed such that portions of functions are implemented at different physical locations by one or more physical devices. In some examples, communications manager 415 and/or at least some of its various sub-components may be a separate and distinct component in accordance with various aspects of the present disclosure. In other examples, communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 415 may identify, by a UE, an amount of ACK reduction associated with a non-central-processing unit or an AP of the UE, determine, at the UE, whether to modify a TCP ACK management scheme based on the amount of ACK reduction associated with the non-central-processing unit or the AP, and transmit ACKs in accordance with the TCP ACK management scheme.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
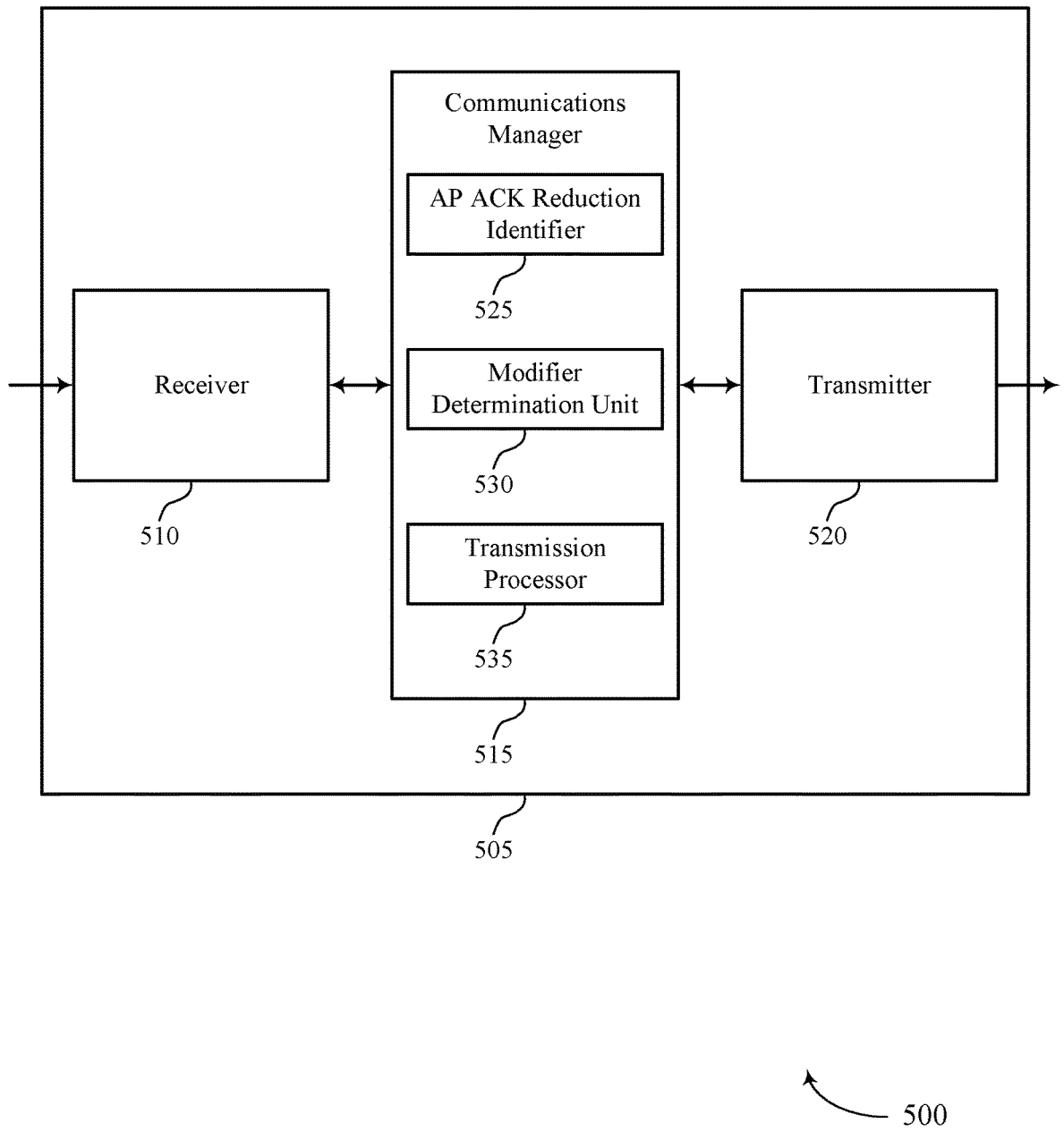

FIG. 5 shows a block diagram 500 of a wireless device 505 that supports transmission control protocol acknowledgement management in accordance with aspects of the present disclosure. Wireless device 505 may be an example of aspects of a wireless device 405 or a UE 115 as described with reference to FIG. 4. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to transmission control protocol acknowledgement management, etc.). Information may be passed on to other components of the device. The receiver 510 may be an example of aspects of the transceiver 735 described with reference to FIG. 7. The receiver 510 may utilize a single antenna or a set of antennas.

Communications manager 515 may be an example of aspects of the UE communications manager 715 described with reference to FIG. 7 or the base station communications manager 815 described with reference to FIG. 8.

Communications manager 515 may also include AP ACK reduction identifier 525, modifier determination unit 530, and transmission processor 535.

AP ACK reduction identifier 525 may identify, by a UE, an amount of ACK reduction associated with a non-central-processing unit or an AP of the UE. The ACK reduction may be based on an amount of aggregation of data (e.g., packets) received by the UE (e.g., via a network interface of the UE). The amount of ACK reduction may be based at least in part on a bit rate of a packet rate of data on the corresponding TCP connection. The amount of ACK reduction may be lower for lower bit rates, and may increase as the bit rates of the TCP connection increase.

Modifier determination unit 530 may determine, at the UE, whether to modify a TCP ACK management scheme based on the amount of ACK reduction associated with a non-central-processing unit or by the AP.

Transmission processor 535 may transmit ACKs in accordance with the TCP ACK management scheme, and may coordinate with transmitter 520.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
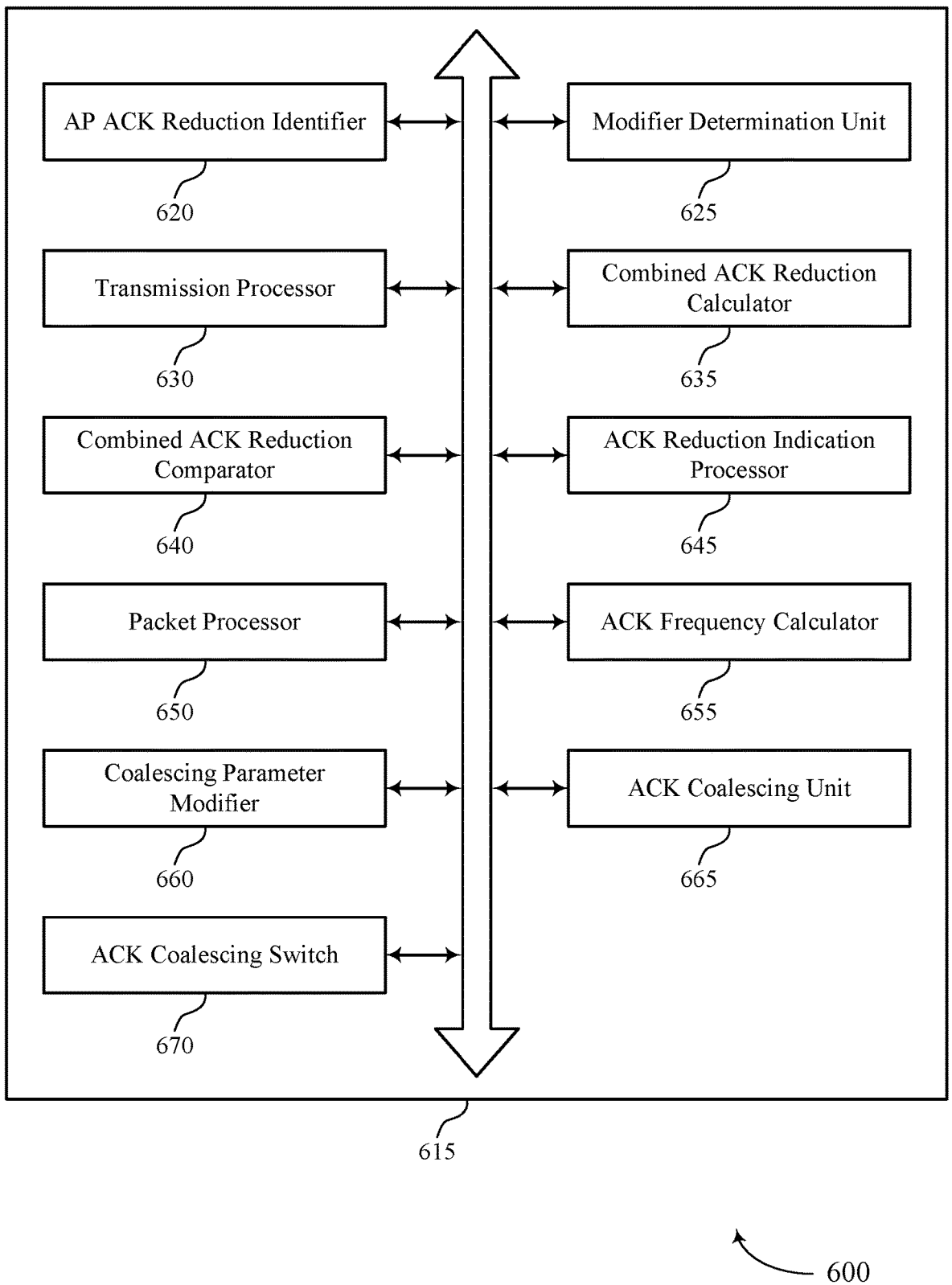

FIG. 6 shows a block diagram 600 of a communications manager 615 that supports transmission control protocol acknowledgement management in accordance with aspects of the present disclosure. The communications manager 615 may be an example of aspects of a communications manager 415, a communications manager 515, a UE communications manager 715, or a base station communications manager 815 described with reference to FIGS. 4, 5, 7, and 8. The communications manager 615 may include AP ACK reduction identifier 620, modifier determination unit 625, transmission processor 630, combined ACK reduction calculator 635, combined ACK reduction comparator 640, ACK reduction indication processor 645, packet processor 650, ACK frequency calculator 655, coalescing parameter modifier 660, ACK coalescing unit 665, and ACK coalescing switch 670. Each of these modules may communicate, directly or indirectly, with one another (e.g., via one or more buses).

AP ACK reduction identifier 620 may identify, by a UE, an amount of ACK reduction associated with a non-central-processing unit or an AP of the UE. The amount of ACK reduction may be based at least in part on a bit rate of a packet rate of data on the corresponding TCP connection. The amount of ACK reduction may be lower for lower bit rates, and may increase as the bit rates of the TCP connection increase.

Modifier determination unit 625 may determine, at the UE, whether to modify a TCP ACK management scheme based on the amount of ACK reduction associated with a non-central-processing unit or the AP.

Transmission processor 630 may transmit ACKs in accordance with the TCP ACK management scheme.

Combined ACK reduction calculator 635 may calculate a combined ACK reduction as a result of the ACK reduction associated with the non-central-processing unit or the AP. In some cases, determining whether to modify the TCP ACK management scheme includes determining a combined ACK reduction as a combination of the ACK reduction associated with the non-central-processing unit or the AP of the UE and the TCP ACK management scheme. Combined ACK reduction comparator 640 may determine whether the combined ACK reduction satisfies a threshold.

ACK reduction indication processor 645 may receive an indication of the amount of ACK reduction associated with the non-central-processing unit or the AP. In some cases, the ACK reduction indication processor 645 may receive, with the indication of the amount of ACK reduction associated with the non-central-processing unit or the AP, an indication that the AP is receiving data pursuant to at least one of a GRO procedure or an RSC procedure. In some cases, the ACK reduction indication processor 645 may determine, for a plurality of packets and based at least in part on the indication, the amount of ACK reduction associated with or applied by the non-central processing unit or the AP. In some cases, the ACK reduction indication processor 645 may determine, for each of a plurality of streams and based at least in part on the indication, the amount of ACK reduction associated with or applied by the non-central processing unit or the AP. In this case, the AP may send a time indication and the ACK reduction indication processor 645 may intelligently use the time indication to determine the amount of ACK reduction applied to different streams having different traffic patterns.

Packet processor 650 may process a group of packets received from the non-central-processing unit or AP. In some cases, identifying the amount of ACK reduction associated with the non-central-processing unit or the AP at the UE includes receiving, from the non-central-processing unit or the AP, a set of packets for transmission.

ACK frequency calculator 655 may determine a TCP ACK frequency within the set of packets. In some cases, determining the TCP ACK frequency includes determining that a number of TCP ACKs included in the set of packets is equal to a multiple of an MSS for the set of packets. In other cases, determining the TCP ACK frequency includes determining that a number of TCP ACKs included in the plurality of packets matches an expected TCP ACK frequency for a corresponding TCP stream directed towards the non-central processing unit or the AP.

Coalescing parameter modifier 660 may modify a TCP ACK coalescing parameter in order to modify the TCP ACK management scheme, where the TCP ACK coalescing parameter includes a packet-to-TCP ACK ratio.

ACK coalescing unit 665 may apply the TCP ACK management scheme, e.g., by reducing the number of TCP ACKs in a set of packets. In some cases, modifying the TCP ACK coalescing parameter includes dropping TCP ACKs from a set of packets received from the non-central-processing unit or the AP based on the packet-to-TCP ACK ratio.

ACK coalescing switch 670 may disable the TCP ACK management scheme for a set of packets, e.g., in response to determining that the TCP ACK management scheme is to be modified. In some cases, determining whether to modify the TCP ACK management scheme includes determining to refrain from modifying a number of TCP ACKs in a set of packets received from the non-central-processing unit or the AP based on a combination of the ACK reduction associated with the non-central-processing unit or the AP of the UE and the TCP ACK management scheme not satisfying a threshold.

Figure 7:
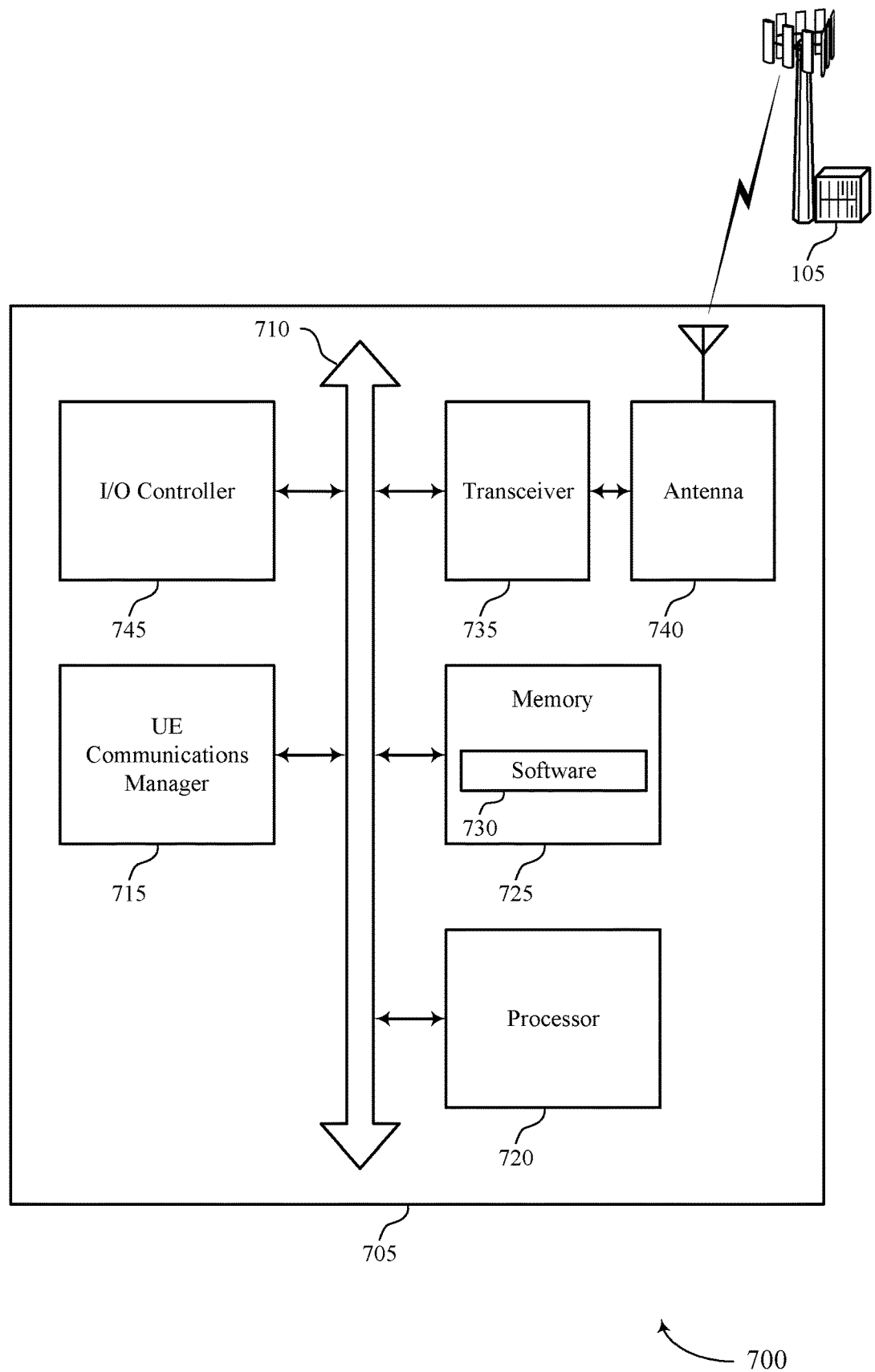
FIG. 7 illustrates a block diagram of a system including a user equipment (UE) that supports transmission control protocol acknowledgement management in accordance with aspects of the present disclosure.

FIG. 7 shows a diagram of a system 700 including a device 705 that supports transmission control protocol acknowledgement management in accordance with aspects of the present disclosure. Device 705 may be an example of or include the components of wireless device 405, wireless device 505, or a UE 115 as described above, e.g., with reference to FIGS. 4 through 6. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting transmission control protocol acknowledgement coalescing).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support transmission control protocol acknowledgement coalescing. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
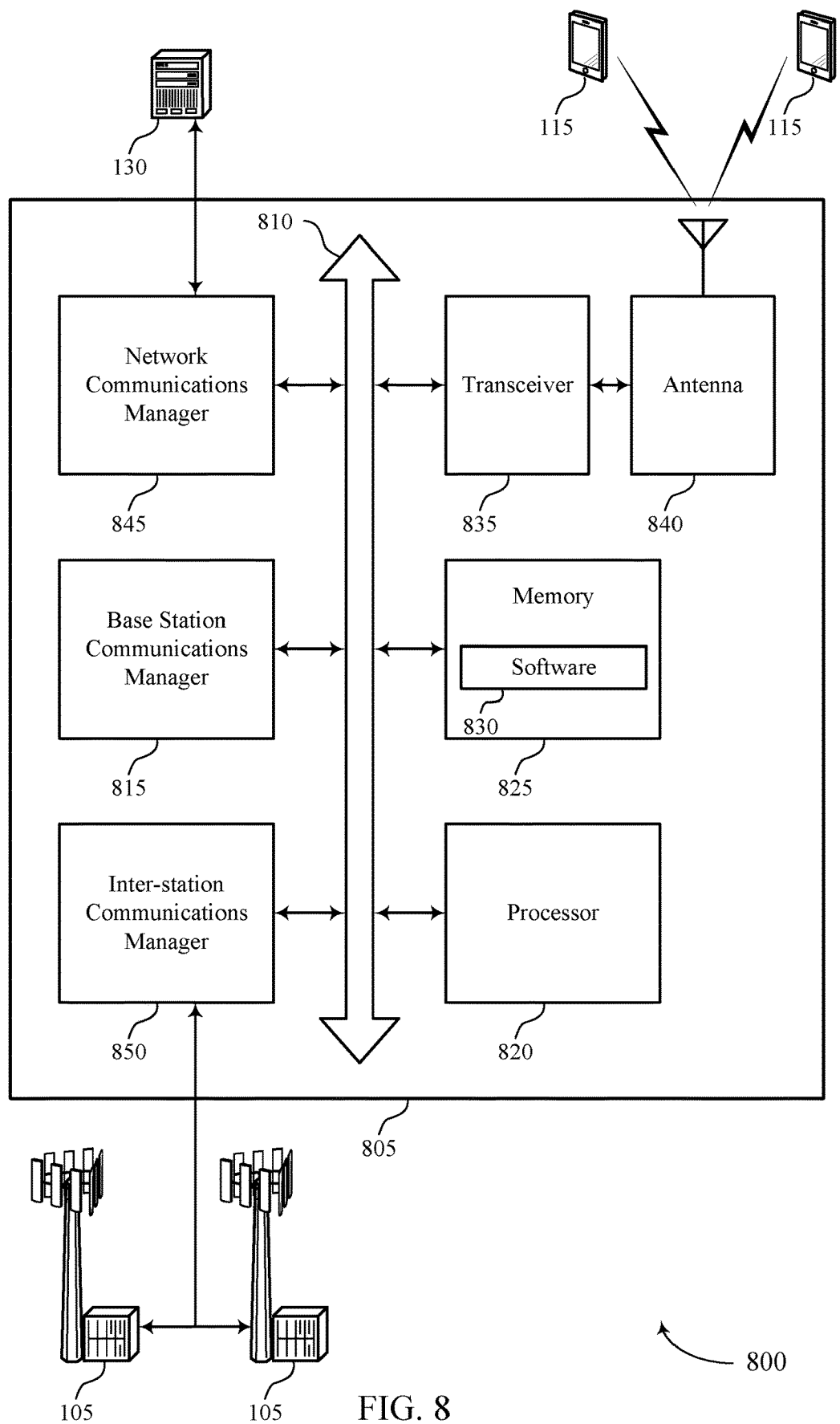
FIG. 8 illustrates a block diagram of a system including a base station that supports transmission control protocol acknowledgement management in accordance with aspects of the present disclosure.

FIG. 8 shows a diagram of a system 800 including a device 805 that supports transmission control protocol acknowledgement management in accordance with aspects of the present disclosure. Device 805 may be an example of or include the components of wireless device 405, wireless device 505, or a base station 105 as described above, e.g., with reference to FIGS. 4 through 6. Device 805 may include components for bi-directional voice and data communications including components for transmitting and receiving communications, including base station communications manager 815, processor 820, memory 825, software 830, transceiver 835, antenna 840, network communications manager 845, and inter-station communications manager 850. These components may be in electronic communication via one or more buses (e.g., bus 810). Device 805 may communicate wirelessly with one or more UEs 115.

Processor 820 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting transmission control protocol acknowledgement coalescing).

Memory 825 may include RAM and ROM. The memory 825 may store computer-readable, computer-executable software 830 including instructions that, when executed, cause the processor to perform various functions described herein. In some cases, the memory 825 may contain, among other things, a BIOS which may control basic hardware or software operation such as the interaction with peripheral components or devices.

Software 830 may include code to implement aspects of the present disclosure, including code to support repetition-based transmissions. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base station 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an Long Term Evolution (LTE)/LTE-A wireless communication network technology to provide communication between base stations 105.

Figure 9:
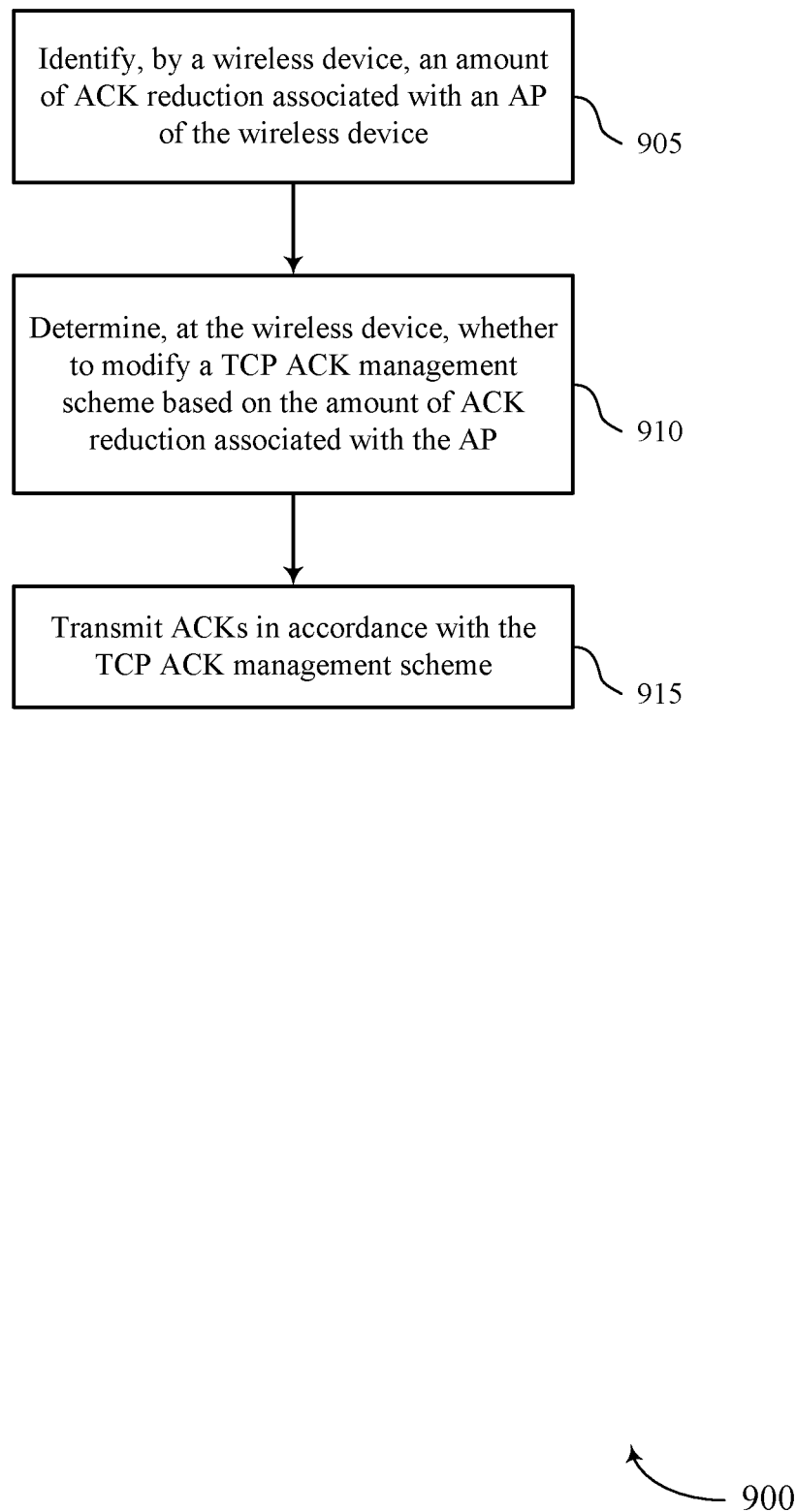
FIG. 9 illustrates a method for transmission control protocol acknowledgement management in accordance with aspects of the present disclosure.

FIG. 9 shows a flowchart illustrating a method 900 for transmission control protocol acknowledgement management in accordance with aspects of the present disclosure. The operations of method 900 may be implemented by a UE 115 or its components as described herein. Alternatively, the operations of method 900 may be implemented by a base station 105 or its components as described herein. For example, the operations of method 900 may be performed by a communications manager as described with reference to FIGS. 4 through 6, including a UE communications manager or a base station communications manager, as described with reference to FIGS. 7 and 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 905 the UE 115 or base station 105 may identify an amount of ACK reduction associated with an AP of a wireless device. The operations of 905 may be performed according to the methods described herein. In certain examples, aspects of the operations of 905 may be performed by an AP ACK reduction identifier as described with reference to FIGS. 4 through 8.

At 910 the UE 115 or base station 105 may determine whether to modify a TCP ACK management scheme based at least in part on the amount of ACK reduction associated with the AP. The operations of 910 may be performed according to the methods described herein. In certain examples, aspects of the operations of 910 may be performed by a modifier determination unit as described with reference to FIGS. 4 through 8.

At 915 the UE 115 or base station 105 may transmit ACKs in accordance with the TCP ACK management scheme. The operations of 915 may be performed according to the methods described herein. In certain examples, aspects of the operations of 915 may be performed by a transmission processor as described with reference to FIGS. 4 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software (e.g., executed by a processor), or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying, by a wireless device, an amount of acknowledgement (ACK) reduction associated with an applications processor (AP) of the wireless device;
determining a combined ACK reduction as a combination of the amount of ACK reduction associated with the AP of the wireless device and an amount of ACK reduction associated with a transmission control protocol (TCP) ACK management scheme;
determining, at the wireless device, whether to modify the TCP ACK management scheme based at least in part on the combined ACK reduction; and
transmitting ACKs in accordance with the TCP ACK management scheme.

2. The method of claim 1, wherein determining whether to modify the TCP ACK management scheme comprises:
determining whether the combined ACK reduction satisfies a threshold.

3. The method of claim 1, wherein the amount of ACK reduction associated with the AP of the wireless device is based at least in part on a bit rate of a packet rate of data on a corresponding TCP connection.

4. The method of claim 1, wherein identifying the amount of ACK reduction associated with the AP of the wireless device comprises:
receiving an indication of the amount of ACK reduction associated with or applied by the AP.

5. The method of claim 4, further comprising:
receiving, with the indication of the amount of ACK reduction associated with the AP, an indication that the AP is receiving data pursuant to at least one of a generic receive offload (GRO) procedure or a receive segment coalescing (RSC) procedure.

6. The method of claim 4, further comprising:
determining, for a plurality of packets and based at least in part on the indication, the amount of ACK reduction associated with or applied by the AP.

7. The method of claim 4, further comprising:
determining, for each of a plurality of streams and based at least in part on the indication, the amount of ACK reduction associated with or applied by the AP.

8. The method of claim 1, wherein identifying the amount of ACK reduction associated with the AP at the wireless device comprises:
receiving, from the AP, a plurality of packets for transmission; and
determining a TCP ACK frequency within the plurality of packets.

9. The method of claim 8, wherein determining the TCP ACK frequency comprises:
determining that a number of TCP ACKs included in the plurality of packets is equal to a multiple of a maximum segment size (MSS) for the plurality of packets.

10. The method of claim 8, wherein determining the TCP ACK frequency comprises:
determining that a number of TCP ACKs included in the plurality of packets matches an expected TCP ACK frequency for a corresponding TCP stream directed towards the AP.

11. The method of claim 1, further comprising:
modifying a TCP ACK coalescing parameter in order to modify the TCP ACK management scheme, wherein the TCP ACK coalescing parameter comprises a packet-to-TCP ACK ratio.

12. The method of claim 11, wherein modifying the TCP ACK coalescing parameter comprises:
dropping TCP ACKs from a plurality of packets received from the AP based at least in part on the packet-to-TCP ACK ratio.

13. The method of claim 1, wherein determining whether to modify the TCP ACK management scheme comprises:
determining to refrain from modifying a number of TCP ACKs in a plurality of packets received from the AP based at least in part on the combined ACK reduction not satisfying a threshold.

14. The method of claim 1, wherein the AP is implemented in one of hardware, software, or any combination thereof.

15. A wireless device for wireless communication, comprising:
a processor;
memory coupled to the processor; and
instructions stored in the memory and executable by the processor to cause the wireless device to:
identify, by the wireless device, an amount of acknowledgement (ACK) reduction associated with an applications processor (AP) of the wireless device;
determine a combined ACK reduction as a combination of the amount of ACK reduction associated with the AP of the wireless device and an amount of ACK reduction associated with a transmission control protocol (TCP) ACK management scheme;
determine, at the wireless device, whether to modify the TCP ACK management scheme based at least in part on the combined ACK reduction; and
transmit ACKs in accordance with the TCP ACK management scheme.

16. The wireless device of claim 15, wherein the instructions to determine whether to modify the TCP ACK management scheme are executable by the processor to cause the wireless device to:
determine whether the combined ACK reduction satisfies a threshold.

17. The wireless device of claim 15, wherein the amount of ACK reduction associated with the AP of the wireless device is based at least in part on a bit rate of a packet rate of data on a corresponding TCP connection.

18. The wireless device of claim 15, wherein the instructions to identify the amount of ACK reduction associated with the AP of the wireless device are executable by the processor to cause the wireless device to:
receive an indication of the amount of ACK reduction associated with or applied by the AP.

19. The wireless device of claim 18, wherein the instructions are further executable by the processor to cause the wireless device to:
receive, with the indication of the amount of ACK reduction associated with the AP, an indication that the AP is receiving data pursuant to at least one of a generic receive offload (GRO) procedure or a receive segment coalescing (RSC) procedure.

20. The wireless device of claim 18, wherein the instructions are further executable by the processor to cause the wireless device to:
determine, for a plurality of packets and based at least in part on the indication, the amount of ACK reduction associated with or applied by the AP.

21. The wireless device of claim 15, wherein the instructions to identify the amount of ACK reduction associated with the AP at the wireless device are executable by the processor to cause the wireless device to:
receive, from the AP, a plurality of packets for transmission; and
determine a TCP ACK frequency within the plurality of packets.

22. The wireless device of claim 21, wherein the instructions to determine the TCP ACK frequency are executable by the processor to cause the wireless device to:
determine that a number of TCP ACKs included in the plurality of packets is equal to a multiple of a maximum segment size (MSS) for the plurality of packets.

23. The wireless device of claim 21, wherein the instructions to determine the TCP ACK frequency are executable by the processor to cause the wireless device to:
determine that a number of TCP ACKs included in the plurality of packets matches an expected TCP ACK frequency for a corresponding TCP stream directed towards the AP.

24. The wireless device of claim 15, wherein the instructions are further executable by the processor to cause the wireless device to:
modify a TCP ACK coalescing parameter in order to modify the TCP ACK management scheme, wherein the TCP ACK coalescing parameter comprises a packet-to-TCP ACK ratio; and
drop TCP ACKs from a plurality of packets received from the AP based at least in part on the packet-to-TCP ACK ratio.

25. A wireless device for wireless communication, comprising:
means for identifying, by the wireless device, an amount of acknowledgement (ACK) reduction associated with an applications processor (AP) of the wireless device;
means for determining a combined ACK reduction as a combination of the amount of ACK reduction associated with the AP of the wireless device and an amount of ACK reduction associated with a transmission control protocol (TCP) ACK management scheme;
means for determining, at the wireless device, whether to modify the TCP ACK management scheme based at least in part on the combined ACK reduction; and
means for transmitting ACKs in accordance with the TCP ACK management scheme.

26. The wireless device of claim 25, wherein the means for determining whether to modify the TCP ACK management scheme comprises:
means for determining whether the combined ACK reduction satisfies a threshold.

27. The wireless device of claim 25, wherein the means for identifying the amount of ACK reduction associated with the AP of the wireless device comprises:
means for receiving an indication of the amount of ACK reduction associated with or applied by the AP.

28. A non-transitory computer-readable medium storing code for wireless communication, the code comprising instructions executable by a processor to:
identify, by a wireless device, an amount of acknowledgement (ACK) reduction associated with an applications processor (AP) of the wireless device;
determine a combined ACK reduction as a combination of the amount of ACK reduction associated with the AP of the wireless device and an amount of ACK reduction associated with a transmission control protocol (TCP) ACK management scheme;
determine, at the wireless device, whether to modify the TCP ACK management scheme based at least in part on the combined ACK reduction; and
transmit ACKs in accordance with the TCP ACK management scheme.

29. The non-transitory computer-readable medium of claim 28, wherein the instructions to identify the amount of ACK reduction associated with the AP of the wireless device are executable by the processor to:
receive an indication of the amount of ACK reduction associated with or applied by the AP; and
receive, with the indication of the amount of ACK reduction associated with the AP, an indication that the AP is receiving data pursuant to at least one of a generic receive offload (GRO) procedure or a receive segment coalescing (RSC) procedure.

30. The non-transitory computer-readable medium of claim 28, wherein the instructions to identify the amount of ACK reduction associated with the AP at the wireless device are executable by the processor to:
receive, from the AP, a plurality of packets for transmission; and
determine a TCP ACK frequency within the plurality of packets; and
determine that a number of TCP ACKs included in the plurality of packets is equal to a multiple of a maximum segment size (MSS) for the plurality of packets.

* * * * *